(12) United States Patent
Aletto et al.

(10) Patent No.: US 8,019,130 B2
(45) Date of Patent: Sep. 13, 2011

(54) COLLECTABLE FINGERPRINTED APPARATUS AND METHODS

(76) Inventors: Mark V. Aletto, Moon Township, PA (US); Darryl S. Griffing, Canton, CT (US); Richard J. Mackey, Moon Township, PA (US)

(*) Notice: Subject to any disclaimer, the term of this patent is extended or adjusted under 35 U.S.C. 154(b) by 1293 days.

(21) Appl. No.: 11/536,783

(22) Filed: Sep. 29, 2006

(65) Prior Publication Data
US 2007/0087795 A1     Apr. 19, 2007

Related U.S. Application Data

(60) Provisional application No. 60/722,480, filed on Sep. 30, 2005.

(51) Int. Cl.
| B42D 15/00 | (2006.01) |
| G09C 3/00 | (2006.01) |
| G06K 9/00 | (2006.01) |
| B41L 1/00 | (2006.01) |
| B41M 3/14 | (2006.01) |
| B44F 1/12 | (2006.01) |

(52) U.S. Cl. ............... 382/124; 283/72; 283/78; 283/68; 283/67; 283/75; 462/1; 427/7; 382/100

(58) Field of Classification Search .................. None
See application file for complete search history.

(56) References Cited

U.S. PATENT DOCUMENTS

| 5,071,168 A | 12/1991 | Shamos |
| 5,267,756 A | 12/1993 | Molee et al. |
| 5,306,049 A | 4/1994 | Schireck |
| 5,454,600 A | 10/1995 | Floyd |
| 5,611,432 A | 3/1997 | Dods |
| 5,859,377 A | 1/1999 | Mackey et al. |
| 6,082,774 A | 7/2000 | Schlauch |
| 6,609,102 B2 | 8/2003 | Kolls |
| 6,631,201 B1 * | 10/2003 | Dickinson et al. ............ 382/124 |
| 6,995,883 B2 * | 2/2006 | Deinhammer et al. ........... 359/2 |
| 7,686,341 B2 * | 3/2010 | Adamczyk et al. ............. 283/72 |
| 2003/0027635 A1 * | 2/2003 | Walker et al. ................... 463/40 |
| 2004/0076938 A1 * | 4/2004 | Publicover .................... 434/248 |
| 2005/0017501 A1 | 1/2005 | Gluck |
| 2005/0156318 A1 | 7/2005 | Douglas |

* cited by examiner

*Primary Examiner* — Bhavesh Mehta
*Assistant Examiner* — Michelle Entezari
(74) *Attorney, Agent, or Firm* — McNees Wallace & Nurick LLC

(57) ABSTRACT

Collectable fingerprinted items, and methods of making such fingerprinted items, including original and simulated fingerprints for application to an item to create a collectable item. The processes may be used to create a variety of collectable items, such as instrument picks, pendants, key fobs, charms, and other collectables. The process includes taking an original fingerprint impression, using the original impression to create a simulated fingerprint impression. The methods optionally include altering at least one identifying characteristic in a manner that prevents identity theft of other misuse of the fingerprint impression. The process optionally includes applying the simulated fingerprint impression to an item, such as by making a mold incorporating the simulated fingerprint, such as by using CAD/CAM technology and molding an item using the created mold.

17 Claims, 6 Drawing Sheets

COLLECTABLE FINGERPRINTED APPARATUS AND METHODS

CROSS-REFERENCE TO RELATED APPLICATIONS

The present invention claims priority to U.S. Provisional Patent Application Ser. No. 60/722,480 filed on Sep. 30, 2005, which application is hereby incorporated by reference as if set forth in its entirety herein.

FIELD OF THE INVENTION

The present invention is directed to collectable apparatus incorporating fingerprints of persons of interest, such as celebrities, and to methods of producing such apparatus. In particular, the invention provides for authentic, yet secure, placing of fingerprints on various selected apparatus to provide collectable memorabilia. The collectable memorabilia include, but are not limited to, musical instruments and accessories such as guitar picks and drum sticks, CDs and other music and video recording media, sports equipment, steering wheels and steering wheel covers, and jewelry. Indeed, the invention is applicable to any item wherein it is desirable to include a fingerprint to increase the usefulness and/or value of the item.

BACKGROUND OF THE INVENTION

Affixing of celebrity autographs and fingerprints to an item is known to increase the collectable value of the item. For example, various collectable items, and methods of affixing fingerprints to such items, are described in U.S. Pat. No. 6,082,774. However, the methods described in U.S. Pat. No. 6,082,774 are limited to traditional inking of fingers and transfer of ink fingerprints onto selected items. The resulting two-dimensional ink fingerprint is initially unstable until dry, and thereafter is subject to degradation by various means and must be carefully protected. For example, ink fingerprints can be easily smudged until dry, but also may be smudged if exposed to water or solvents, such as in routine cleaning of a display case housing the collectable items.

Additionally, inked items lose their utility since the fingerprint will be smudged or degraded by striking of the fingerprinted surface. For example, in the case of golf balls described in U.S. Pat. No. 6,082,774, the inked print can be damaged whether the collector drops the ball unintentionally, or whether he or anyone else intentionally or accidentally uses the ball in a round of golf. Many collectors have likely lost such valuable items due to children who simply use the collectable item for its intended purpose. Thus, there is a need for an improved method of attaching fingerprints to items to create durable collectable memorabilia.

Commonly-owned U.S. Pat. No. 5,859,377 provides for methods of forming guitar picks having at least a partial fingerprint molded in the surface thereof. The present inventors have found that the guitar picks and methods described therein provide for a durable, three-dimensional fingerprint that actually enhances the utility of the pick by providing a raised grip surface that engages the user's own fingerprints. However, U.S. Pat. No. 5,859,377 does not address the unmet need for a collectable, yet secure, method of providing celebrity fingerprints on such collectable items that will protect the celebrity fingerprint provider from identity theft, unauthorized reproduction, and other misuses of the fingerprint.

In accordance with the known prior art such as the above references, there exists no disclosure providing of a durable, authenticatable, securitized fingerprint to create a collectable item.

There exists a continuing need, therefore, for a durable, authenticatable, securitized fingerprint suitable for attaching to or incorporating into an item to create a collectable item, and for methods of creating such items.

SUMMARY OF THE INVENTION

The primary object of the invention is to provide durable, authenticatable, simulated fingerprint impression suitable for attaching to or incorporating into an item to create a collectable item.

Another object of this invention is to provide methods of providing collectable, durable, authenticatable, secure fingerprints.

Yet another object of this invention is to provide a collectable, authenticatable fingerprint impression that maintains or enhances the utility of the item to which it is attached, without compromising the collector value of the item.

Still another object of the invention is to provide a collectable, authenticatable fingerprint impression that enhances the utility of the item to which it is attached by preserving the location, position, and style of the fingerprint of a particular person of interest, such as a celebrity, on a particular item, such that when the fingerprint is applied to a similar item the resulting item can be used as a training aid to permit a user to emulate the celebrity.

The objects and advantages set forth herein are achieved by the items and methods of the present invention.

As used herein, "fingerprint" shall be read to include any digit or other skin-covered body part, preferably one having unique identifying characteristics thereon, as well as autographs. The term "impression" shall include any fingerprint transferred to any media, whether by inking, molding, photographing, scanning, hot stamping, surface ink imprinting, two-dimensional surface imprinting, laser engraving, or other means known to one skilled in the art. "Original fingerprint" shall include the original fingerprint impression taken directly from a person of interest, regardless of the method or media used to take the original fingerprint. "Simulated fingerprint" shall include any derivation of an original fingerprint, including but not limited to copies of an original fingerprint, altered versions of an original fingerprint, virtual or computer generated fingerprint, holographic or other securitized versions of an original fingerprint, and combinations thereof.

In one embodiment, a process for forming the collectable item includes providing an original fingerprint impression, and altering at least one identifying characteristic of the original fingerprint impression to create a simulated fingerprint impression that is not identical to the original fingerprint. The method optionally includes applying the altered simulated impression to an item to create a collectable item.

In a second embodiment, the process for forming the collectable item includes providing an original fingerprint impression, converting the original fingerprint impression into another medium to create a simulated fingerprint, and optionally altering at least one identifying characteristic of the electronic impression to create an altered simulated fingerprint. Optionally, the method further includes using the altered simulated fingerprint impression to create a tangible securitized simulated fingerprint. The method optionally includes applying the tangible securitized simulated fingerprint to an item to create a collectable item.

These and other details of the present invention are set out in the following description and drawings wherein like reference characters depict like elements. Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1B:
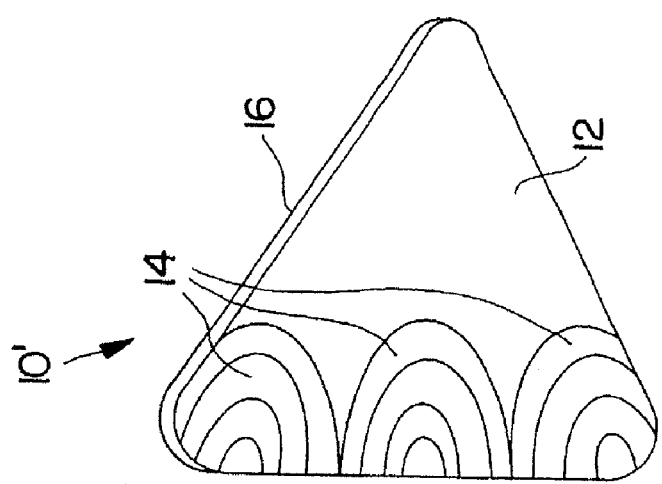
FIG. 1B is an enlarged perspective view of the pick, similar to FIG. 1, showing a different finger impression arrangement.

The present invention provides durable, authenticatable, fingerprints that can be incorporated into virtually any item to create a collectable item without compromising the utility of the item for its intended use. In addition, depending upon the selection of the item, fingerprinted item, such as a training grip for a baseball bat, in addition to being collectable, can be used for its intended recreational purpose, and can also be used to train a user to emulate the celebrity in the use of the item.

In accordance with a first embodiment of the process of the present invention, an original fingerprint impression is provided by a person, preferably a person of celebrity, although other persons of interest, including but not limited to employees, prisoners, and any other person, may provide the original fingerprint for impression. The original impression may be taken by conventional means such as by inking the finger and then pressing the inked finger against a medium such as paper, plastic, metal, or other suitable media. Alternatively, the original fingerprint impression is made in a moldable medium such as clay, dough, soft plastic, or other media known to those skilled in the art of making body part impressions. Alternatively, the original impression may be created and fixed in a tangible medium such as by photographing, scanning, or otherwise electronically or photographically preserving the original fingerprint characteristics in a fixed medium. In any case, the original fingerprint impression can then be copied, edited, converted, and/or altered to form a simulated fingerprint that may be identical to, substantially identical to, or non-identical to, the original fingerprint. Depending upon the medium chosen to capture the original fingerprint, the original fingerprint impression may itself be the collectable item. More commonly, simulated fingerprints derived from the original fingerprint impression will be applied to items to create the collectable item. These aspects, and exemplary methods of practicing the invention, are more fully explained in the following examples.

Example

An original fingerprint impression is made in a moldable material such as plastic. For example, any number of environmentally friendly plastic materials can be heated and softened to accept an impression. Exemplary materials and methods of making impressions, and of molding impressions into plastic materials, are described in commonly-owned U.S. Pat. No. 5,859,377, which Applicants hereby incorporate by reference in its entirety.

After taking the impression, the material is permitted to cure into a permanent, original fingerprint impression, in this case having three-dimensions due to the selected medium of plastic and use of fingertip pressure impression. Next, the three-dimensional original fingerprint impression is converted into an electronic format to create a simulated impression, here an electronic derivation. For example, the original impression, as a three-dimensional impression, may be scanned using a digital scanner linked to a microprocessor running Computer-Aided Design & Computer Aided Manufacturing (hereinafter "CAD/CAM") software. The scanned image is preserved as an electronic file by the CAD/CAM software, the file having data corresponding to the exact three-dimensional characteristics of the original impression. The CAD/CAM software further includes features to allow a user to generate and display an electronic simulated impression that includes all, or a number of selected features of the original fingerprint impression.

The CAD/CAM software further includes instructions that permit a user to manipulate the electronic simulated impression and the data associated therewith so as to alter at least one identifying characteristic, thereby creating an altered simulated impression. Identifying characteristics include any unique feature associated with the original impression, such as the size, spacing, number, type, and shape of fingerprint lines, ridges, valleys, scars, and any other attribute preserved in the original impression. Altering may include the deleting, distorting, resizing, cutting, pasting, and reshaping of any characteristic, as well as random distortion, distortion in identified sectors only, erasure of portions of the original fingerprint, the elimination of every other line, thickening the imprinted features, and insertion of words, symbols, logos, trademarks, and spacing. For example, the altering may be done in a manner that prevents identity theft or other misuse that could otherwise result from public distribution of an original fingerprint impression.

By way of example, in one embodiment, the electronic impression may be divided into distinct sectors, and selected portions with the sectors are then altered so that they no longer correspond with the original impression. Additionally, a logo, type, or other image may be electronically inserted into the electronic image, thereby obscuring a portion of the impression to create an altered simulated impression. By way of further example, the simulated impression may be altered to delete selected lines associated with the original fingerprint. In essence, any portion of the simulated impression may be manipulated to disguise any identifying characteristic otherwise associated with the original impression Of course, an previously noted, such altering is entirely optional, and may not be desirable in all circumstances.

Once the simulated fingerprint impression has been altered to incorporate any and all desired changes, the altered fingerprint impression is saved or otherwise preserved. The simulated fingerprint impression is then used to create a tangible impression in a desired medium, whether the medium is an item itself, or whether the medium is an intermediary medium such as a tape, sticker, laminate, or other medium that can be applied to an item.

In the continuing example of a CAD/CAM embodiment, the simulated impression may be embodied in a mold that is cut and created using known CAD/CAM processes, the mold being suitable for mass-producing replicas of the simulated impression in a preselected medium. The simulated impression may be directly embodied in a manufactured article, such as by molding the impression into an article during the manufacturing of the article. For example, the altered electronic impression may be merged with another CAD/CAM file specifying another distinct molded article such as a plastic football, the football then being molded to incorporate simultaneously all the characteristics of the simulated impression, and the plastic cup as specified in the CAD/CAM files. The resulting football would include a simulated fingerprint impression that would enhance collector value, but that can also be used to throw and catch. In addition, where the simulated fingerprint impression is a handprint of a celebrity quarterback made by holding the football in his preferred grip style and location, the football can also be used as a training aid to teach the user the proper hand and finger positions to emulate that celebrity. Such impressed training items can be made using the present invention for any number of sports and musical applications to allow users to emulate the celebrity's preferred hand, finger, foot, or other impressible body part location. Without limiting the invention, such examples include golf club grips, tennis racquet grips, baseball bats, bowling balls, surfboard and skateboard surfaces, steering wheels, guitar necks, guitar picks, drum sticks, keyboards, car key holders and grips, necklaces and charm bracelets and charms, pendants, key chain fobs, and zipper pulls.

In another embodiment, the molded item is a guitar pick. The guitar pick may optionally be made from luminescent material and/or incorporates an internal illuminating device so that pick glows in the dark. Additionally or alternatively, any of the molded items incorporating a simulated fingerprint impression may include luminescent materials and/or illuminating devices. To further permit authentification and tracking of collectable items of the present invention, the items may include Radio Frequency Identification Tags ("RFIDs"). Such tags are commercially available and are in use with consumer items such as tires and other items which require tracking, although for different purposes such as factory recalls.

As previously described, any original or simulated fingerprint impression may be used to manufacture standalone tangible simulated impression that may itself be collectable, or that may be applied to an item to enhance collectability and/or usefulness and/or functionality of the item. Preferably, the standalone simulated impression is a three-dimensional impression that can be applied to an item, such as by glue, adhesive, or other known attachment means, to produce a collectable, useful item.

In another example, a simulated fingerprint impression may be used to manufacture collectable item that are not molded products. For example, the altered electronic impression can be used by CAD/CAM software and associated engraving, embossing, or other image-fixing equipment to create a non-molded simulated impression on the surface of virtually any item. For example, engravable items include, but are not limited to jewelry, glassware, utensils, guitar picks, and any other collectable item having an exposed engravable surface. Embossable items include patches that can be applied to hats, jackets, jewelry and other clothing and accessory items. Preferably, the engraving or embossing produces an accurate three-dimensional reproduction of the original impression that also includes any desired alterations and/or the securitized features incorporated into the simulated fingerprint impression. The inclusion of accurate three-dimensional features in a simulated fingerprint impression is believed by the inventors to be novel.

The present invention further includes use of simulated fingerprint impressions in combination with consumer goods to enhance sales of the consumer goods and/or to advertise or otherwise promote another good or service. For example, collectable items having a simulated fingerprint impression associated therewith can be packaged in combination with products such as, but not limited to, musical equipment and instruments, music CDs, entertainment DVDs, music and sports publications, packaged foods, guitar miniatures, CDs in the shape of a pick, and other collectable accessories, promotional food packaging, and virtually any other consumer good. In another embodiment, simulated fingerprint impressions can be used in advertising promotion for goods or services, such as giveaway key fobs, pens, stickers, and other promotional items known to those skilled in the art. In one preferred embodiment, the packaging combination includes a holographic image on the securitized item and/or the associated consumer good.

Figure 8:
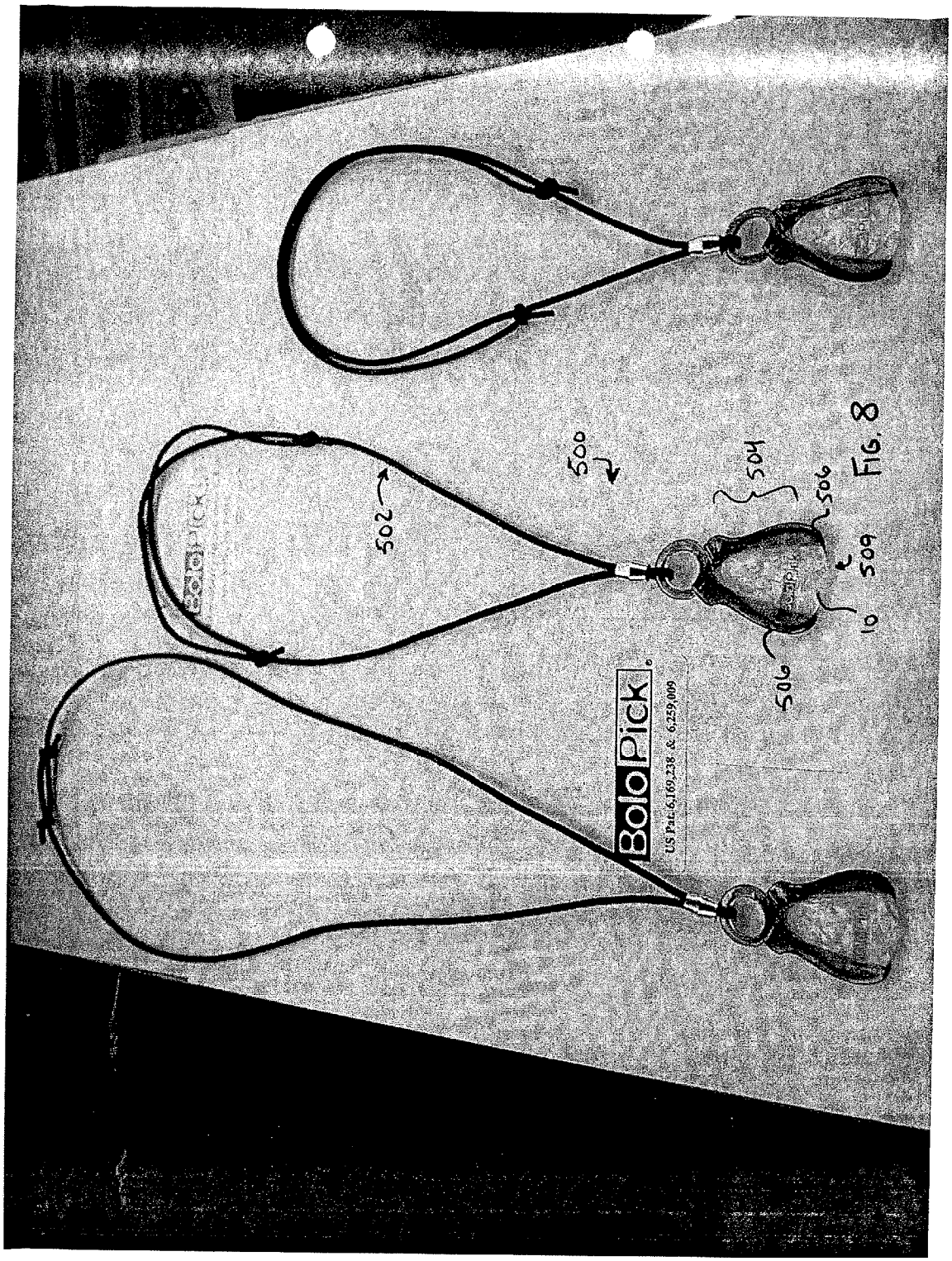
FIG. 8 is a first jewelry item for use in combination with a pick of the present invention.
Figure 9:
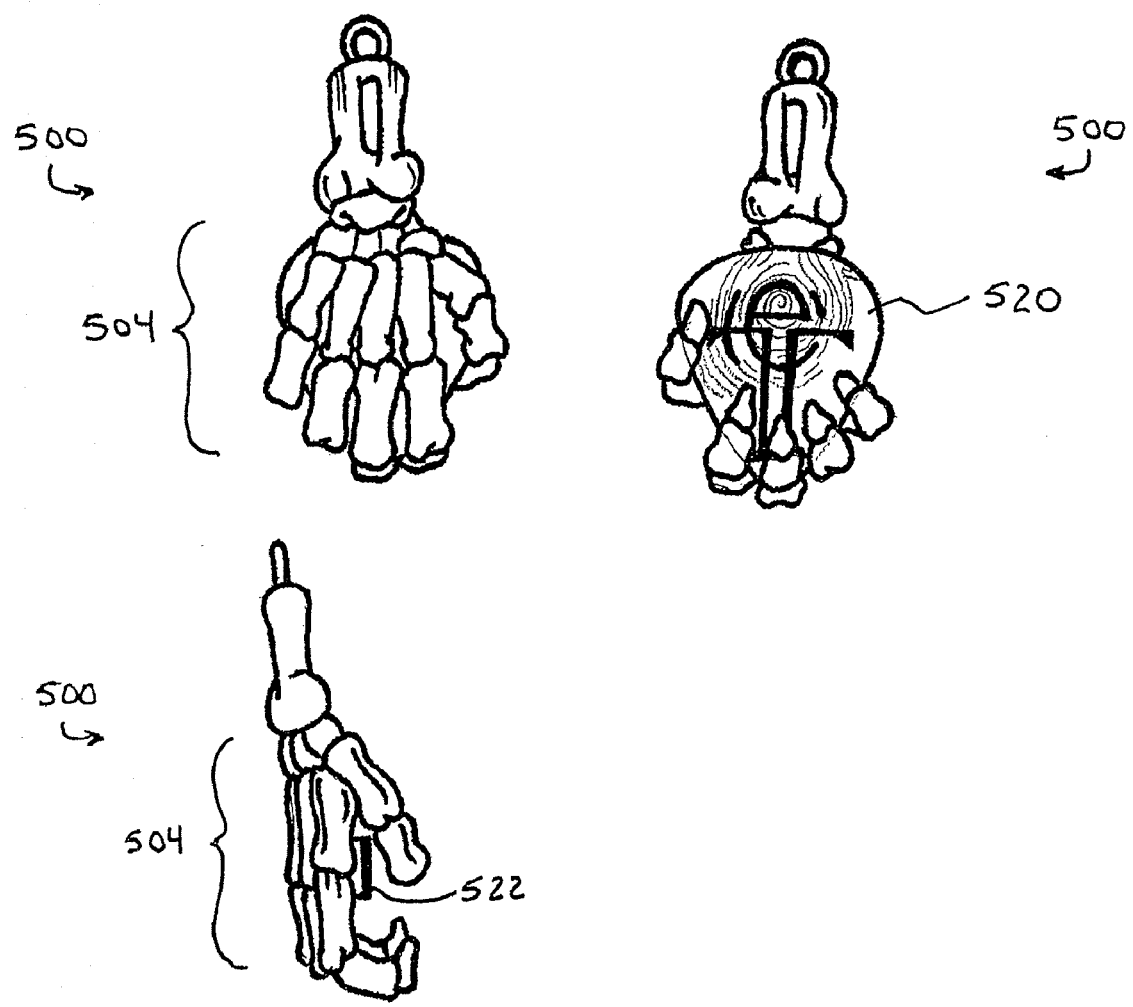
FIG. 9 is a second jewelry item for use in combination with a pick of the present invention.

In yet another embodiment, the invention includes a collectable item having a simulated fingerprint impression in combination with an item holder for displaying the item. For example where the collectable item is a guitar pick having a three-dimensional simulated fingerprint impression incorporated therein, a jewelry item may be provided in combination therewith to securely hold the pick while still allowing for display of the pick. Preferably, the simulated fingerprint is securitized, such as by altering at least one identifying characteristic of the original fingerprint. An example of such combinations are illustrated in FIGS. 8 and 9 hereof. The particular jewelry item of FIG. 8 is covered by U.S. Pat. Nos. 6,169,238 and 6,259,009, which patents are hereby incorporated herein by reference.

Figure 1A:
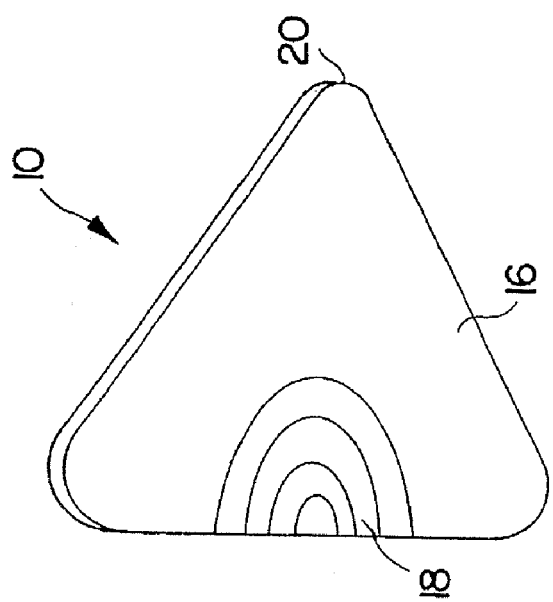
FIG. 1A is a reverse side perspective view of the pick shown in FIG. 1.
Figure 1:
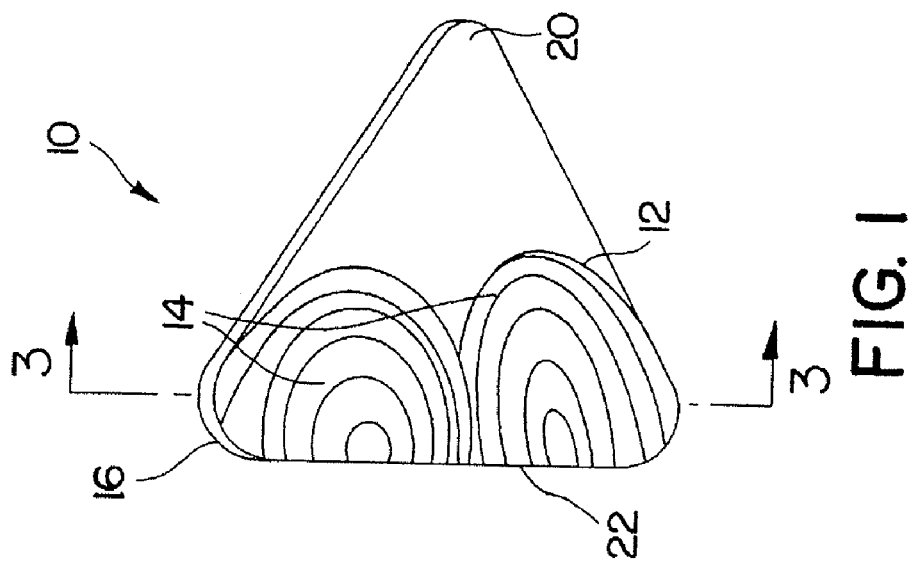
FIG. 1 is an enlarged perspective view of a stringed musical instrument pick in accordance with the principles of the present invention.

By way of further explanation of the present invention, Applicant now refers to the drawings in detail. By way of example, there is shown in FIGS. 1 and 1A a perspective view of a stringed musical instrument pick or plectrum in accordance with the principles of the present invention, and is designated generally as 10. Pick 10 generally includes a first surface 12 having an impressed area 14 and a second surface 16 having an impressed area 18 (shown in FIG. 1A only). The impressed area 18 shown is exemplary, and its use in the instant invention is not limited to guitar picks.

The pick 10, as described herein, can be used for playing all types of stringed musical instruments including guitars, harpsichords, banjos, mandolins, etc. The particular pick 10 shown in the drawings is directed toward use with guitars although the invention described herein can be used with picks used for any of the instruments mentioned above.

Figure 2:
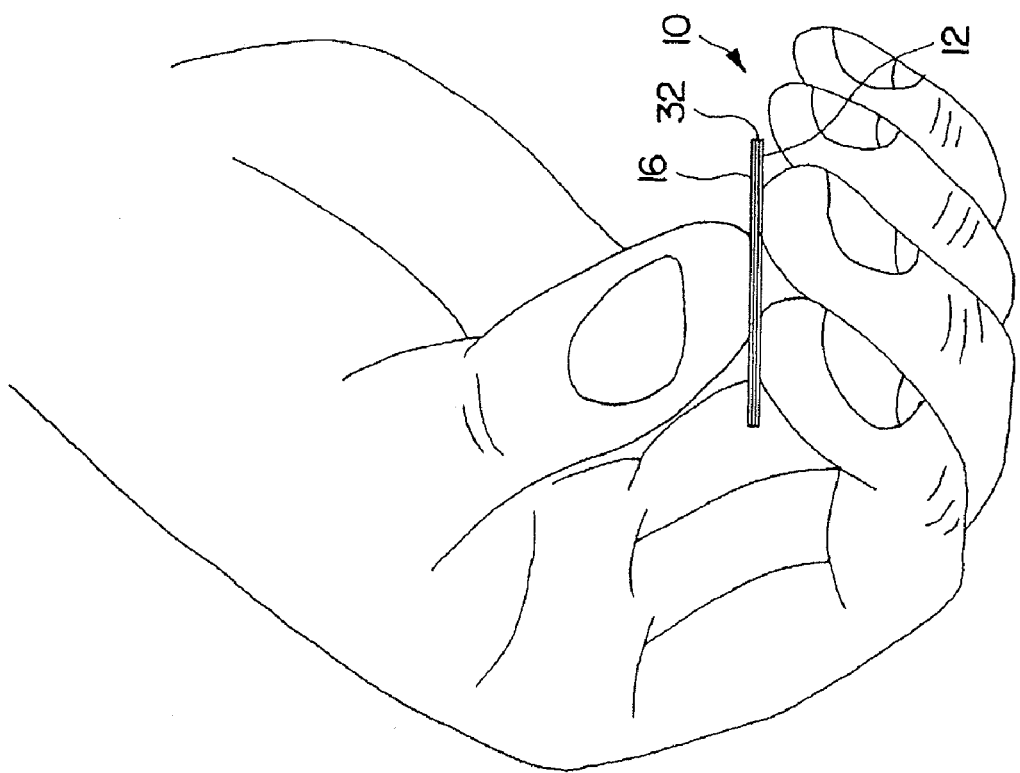
FIG. 2 is a view of a typical grip used for holding a pick and for use in a method for forming original fingertip impressions in the surfaces of a pick in accordance with the principles of the present invention.

Stringed musical instrument picks are generally triangularly shaped as shown in the figures, but may have other shapes that are equally effective. Accordingly, the shape of the pick is not critical to the present invention. The primary feature of this embodiment is the inclusion of unique alterations to the simulated fingerprints that make up the impressed areas on the pick surfaces, and the methods of creating such impressed areas. A pointed area 20 of pick 10 is preferably used for plucking the strings of a musical instrument while pick 10 is held in areas 14 and 18 immediately adjacent edge 22, for example. As shown, for pick 10 of the present invention, areas 14 and 18 are securitized fingerprint impressed areas, having collectable value deriving from the celebrity of the fingerprint source, as well as utility for pick grasping of the musician using the pick for playing a stringed musical instrument, as shown in FIG. 2.

Figure 3:
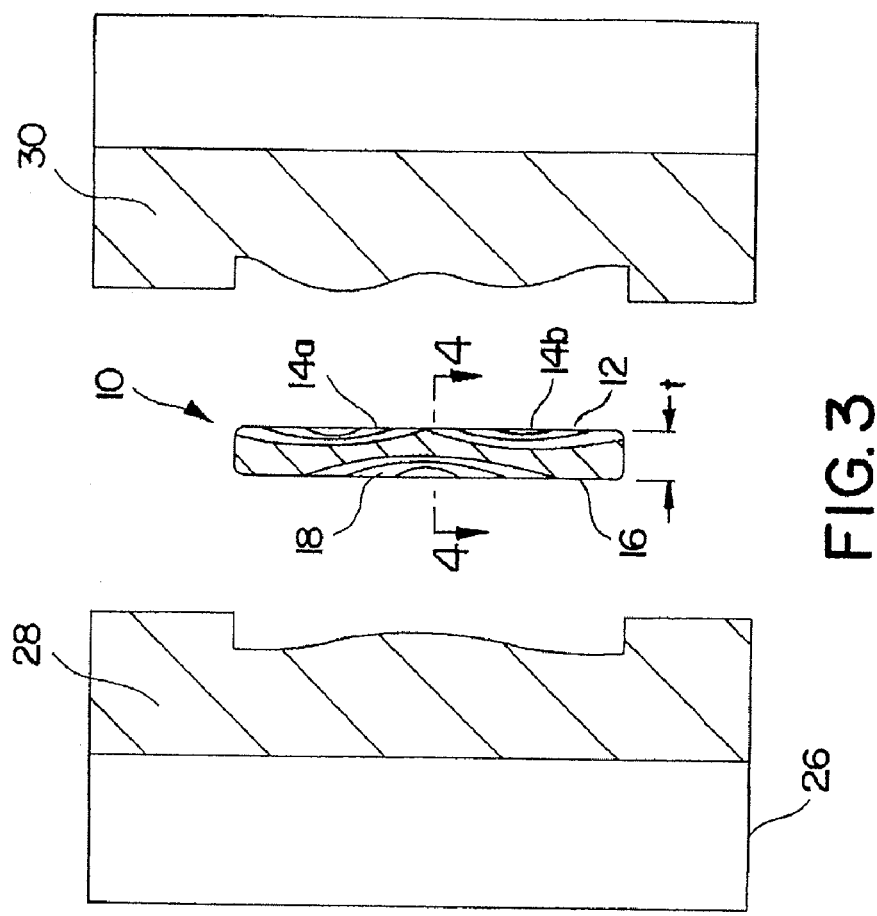
FIG. 3 is a cross-sectional, enlarged end view of the stringed musical instrument pick taken along line 3-3 of FIG. 1 and a device for molding the pick, in accordance with the principles of the present invention.
Figure 4:
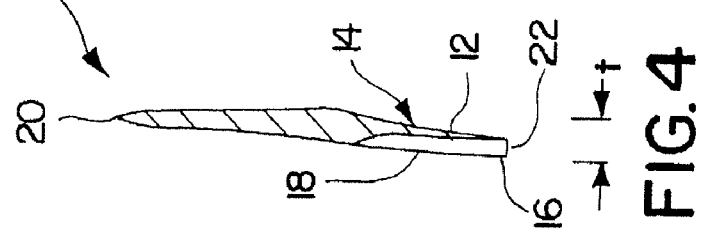
FIG. 4 is an overhead cross-sectional enlarged view of the stringed musical instrument pick shown in FIGS. 1 and 3 taken along line 4-4 of FIG. 3, in accordance with the principles of the present invention.

Referring to FIGS. 3 and 4, impressed areas 14 and 18 are securitized replicas of the fingertip impressions, preferably of a celebrity musician. With pick 10 having a thickness ("t"), impressed areas 14 and 18 are preferably indented or recessed into thickness t with the securitized impression slightly inward of edge 22. Typically, at least two or three different securitized fingertip impressions are formed in surfaces 12 and 16 in areas 14 and 18, as indicated in FIG. 3 by area 18 in surface 16 and areas 14a and 14b in surface 12. Most preferably, the fingertip impression replicated on surface 16 at area 18 is a securitized thumb fingertip impression and on surface 12 at areas 14a and 14b, and securitized forefinger and middle-finger fingertip impressions, respectively, as shown in FIG. 3. This arrangement follows the manner in which the pick is typically held, as indicated in FIG. 2. However, based on the individual needs of the musician, different fingertips and numbers of fingertips can be impressed on surfaces 12 and 16 for forming securitized impressed areas 14 and 18, respectively. For example, some musicians may prefer to hold the pick using the thumb on one side and the forefinger, middle-finger, and neighboring finger on the other side. Securitized impressions in areas 14 and 18 to accommodate this manner of holding the pick are shown in the FIG. 1B embodiment of the pick, designated as pick 10.

The particular type of material used for forming pick 10 with securitized impressed areas 14 and 18 is dependent upon the process used for forming the same. If a large quantity of picks is desired to be formed for collectors or even for use by a musician over a long period of time, the most efficient manner of forming the pick in accordance with the principles of the present invention may be by molding the same, preferably via molding through molding machine 26, preferably an injection molding machine, shown schematically in FIG. 3. In this instance, mold halves 28 and 30 forming a mold in the shape of pick 10 (shown enlarged) and impressed areas 14 and 18, generally replicating the shape and texture of the musician's fingertips, can be used. In accordance with this method, a mold is made from a simulated fingertip impression, preferably an altered electronic simulated impression created using CAD/CAM software and methods, as previously described herein. The CAD/CAM software is then used to instruct a mold-making machine to incorporate all of the three-dimensional features of the simulated fingerprint impression into a mold. To make an item having a securitized simulated impression incorporated therein, mold molding material is be injected into the mold for forming the item, in this case a guitar pick 10. For this pick forming process, the molding material such as that typically used for forming currently known picks can be used for forming the pick in accordance with the principles of this invention or any other materials which suitably become rigid upon cooling can be used. The mold shape may also be altered for varying the thickness or gauge of the picks, as desired by the musician.

Referring again to FIG. 2, a method for taking an original impression of a fingerprint, such as a celebrity fingerprint, is shown. In this embodiment, a malleable pick 10 is provided. Accordingly, to form impressed areas 14 and 18, pressure is applied to surfaces 12 and 16 through the celebrity musician's fingertips on a malleable pick substrate 32, i.e., a substrate formed in the pick shape and from a material exhibiting formability via such pressure and exhibiting subsequent setting to a rigid state at room or elevated temperatures.

Figure 5:
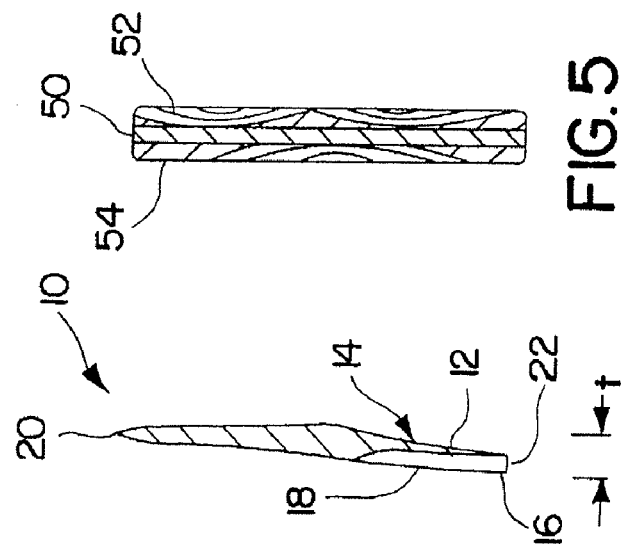
FIG. 5 is a cross-sectional enlarged view of an alternative embodiment of the pick shown in FIG. 3, in accordance with the principles of the present invention.

Alternatively, in accordance with this fingertip pressure application method of forming pick 10 in accordance with the principles of the present invention, and referring to FIG. 5, pick 10 may be formed as a laminate having a central rigid layer 50 laminated on opposed sides thereof, deformable layers 52 and 54. Accordingly, layers 52 and 54 are formed from a material deformable via the application of fingertip pressure. This material will subsequently set to a rigid state when cured.

The materials discussed below may be used to form substrate 32 and layers 52 and 54. Accordingly, several types of materials may be used or combined, such as in layers overlaid on or applied to the pick 10, for forming a fingerprinted pick 10 in accordance with the fingertip pressure application method of forming the original fingertip impression.

One category of material that may be used for substrate 32 is a composition which may be cured or hardened via the presence or application of moisture, preferably ambient moisture, i.e., moisture-hardening compositions. In accordance with this category, U.S. Pat. No. 5,288,797 is hereby incorporated by reference for use herein, with particular reference to the composition disclosed in column 4, line 6 to column 11, line 17. Another example of a moisture hardening composition that may be used is disclosed in U.S. Pat. No. 5,319,050 and is hereby incorporated by reference in particular with reference therein to column 1, line 48 to column 8, line 9. Another moisture curing or hardening composition that may be used for forming the pick substrate of the present invention, the composition disclosed in U.S. Pat. No. 5,321,054 is hereby incorporated by reference for use herein, with particular reference to column 2, line 34 to column 5, line 23.

Thermal-hardening compositions, wherein the material cures or hardens upon heating, and thermal-softening compositions, wherein the material cures or hardens upon cooling, may also be used for forming the disclosed pick 10 via the method of fingertip pressure application, in accordance with the principles of the present invention. The thermal-softening composition disclosed in U.S. Pat. No. 5,431,563, for example, is hereby incorporated by reference for use herein, with particular reference to column 5, line 4 to column 9, line 33.

An example of a thermal-hardening composition which may be used in this invention is disclosed in U.S. Pat. No. 5,321,054 which is hereby incorporated for use herein, with particular reference to column 2, line 34 to column 5, line 22. In accordance with these compositions, the method of forming the pick by exerting fingertip pressure on first and second surfaces 12 and 16 for forming impressed areas 14 and 18, respectively, being impressions of the musician's fingertips, preferably the thumb and forefinger and middle-finger combination, respectively, can be performed.

In one embodiment, after forming pick 10 via one of the methods described above, i.e., via molding or fingertip pressure application forming, pick 10 is used to create an electronic simulated impression, such as by digital scanning of the pick 10 into a microprocessor running computer-executable instructions for creating and preserving data that correlate to each three-dimensional feature of the pick, and particularly the impressed areas 14, 18. As previously described, the electronic data is then used to generate and display a simulated impression, in this example as an editable electronic version of the original impression, the electronic version hereinafter referred to herein as an electronic simulated impression. The electronic simulated impression is edited by a user to alter at least one identifying characteristic in a manner that renders the simulated impression as secure from identity theft or other misuse. As previously described herein, and without limiting the previous disclosure herein, the altering may involve distorting, enlarging, reducing, erasing, cutting and pasting, and inserting data and images into the electronic impression to render an altered electronic impression.

The altering of an original fingerprint or a simulated fingerprint to form an altered simulated fingerprint may be by automated means, or may be performed manually. Altering may be accomplished using an electronic medium, such by using CAD/CAM, Corel Draw, or other electronic media and editing tools, or may be performed in any known art media, such as clay, paper, canvas, whether by painting, sculpting, imprinting, and/or by other known methods, media, and tools known to those skilled in the art.

Figure 6A:
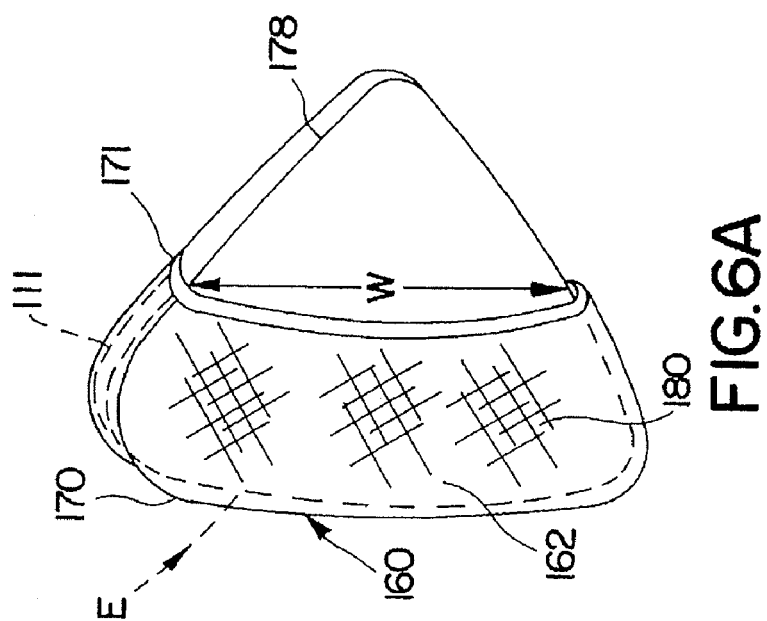
FIG. 6A is a perspective view of the pick holder of FIG. 6 engaged with a pick.
Figure 6:
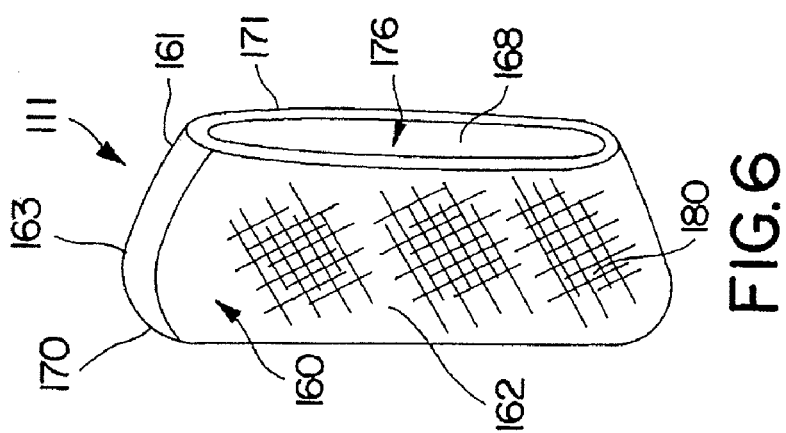
FIG. 6 is a perspective view of an embodiment of a pick holder in accordance with the principles of the present invention.

In addition to the above apparatus and methods, the present invention includes a pick holder 111, as shown in FIGS. 6 and 6A, also in accordance with the principles of the present invention, is used for holding non impressed picks for increasing the grip ability thereof. The pick holder includes sides 160 and 161 having outer surfaces 162 and 163, opposed each other. Sides 160 and 161 are separated by a space 168 but connected at a widest end 170. Preferably, sides 160 and 161 are tapered inwardly from end 170 forming a narrowest end 171. Space 168, in combination with end 170 and inner surfaces 172 and 174 of sides 160 and 161, respectively, forms a pocket 176 for receiving a pick 178 in a manner for firmly holding the same. The pocket, at widest end 170, is of a width to fit, preferably snugly, the widest end E of standard pick 178. The pocket, at narrowest end 171, is of a width to fit, preferably snugly, the width W the portion of the standard pick aligned with end 171, while end E of pick 178 is against the inner surface of end 170 of pick holder 111. Pick holder 111, therefore, preferably has a trapezoidal-type shape, as shown in FIG. 6, with two substantially parallel edges and two converging angled edges connecting the parallel edges. Accordingly, pick holder 111 is preferably formed from a rubber-like material, such as rubber or like forms of plastic, which is flexible for stretching over the standard pick and resilient for returning to its original shape, while also providing non-slip surfaces 162 and 163 having an original or simulated fingerprint impression incorporated therein for increased grippability. That is, in order for end E of pick 178 to fit through end 171, end 171 is stretchable, due to the material selected and preferred, to a width for receiving end E. End 171 of pick holder 111 then returns to substantially its original trapezoidal shape. This feature, combined with the inclusion of a fingerprint impression, substantially increases grippability of the pick 10. Additionally, the non-impressed areas of surfaces 162 and 163 may be abraded or otherwise textured as shown in FIGS. 6 and 6A by texture 180. Such materials for use as described for holder 111 are known and accordingly, are not further described.

As another embodiment of the pick holder described above, a pick holder 211, as shown in FIGS. 7, 7A, and 7B, also in accordance with the principles of the present invention, is used for holding a pick 10 for increasing the grippability thereof. Similar to the picks discussed above, the pick holder includes sides 260 and 261 having outer surfaces 262 and 263, opposed each other, and which each include securitized fingerprint impressions 264, respectively. However, for pick holder 211, sides 260 and 261 are separated by a space 268 but connected at end 270. Space 268, in combination with end 270 and inner surfaces 272 and 274 of sides 260 and 261, respectively, forms a pocket 276 for receiving a pick 278 in a manner for firmly holding the same. Accordingly, inner surfaces 272 and 274 have an adhesive or other tacky substance 280 thereon. Alternatively, and as shown for example in the more enlarged view of FIG. 7B, inner surfaces 272 and 274 may be tapered inwardly toward end 270 so as to provide a portion 282 of space 268 with an interference fit in relation to the thickness "t" of pick 278, for engaging the same.

Figure 7B:
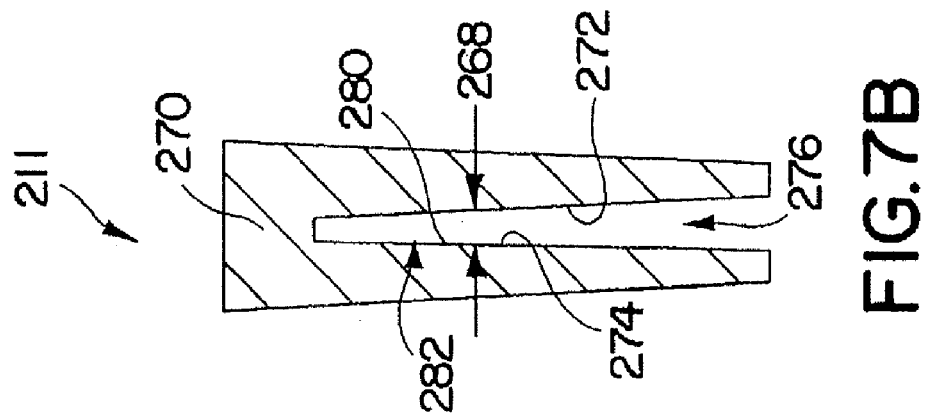
FIG. 7B is an enlarged cross-sectional view of the pick holder of FIG. 7, without a pick therein.
Figure 7A:
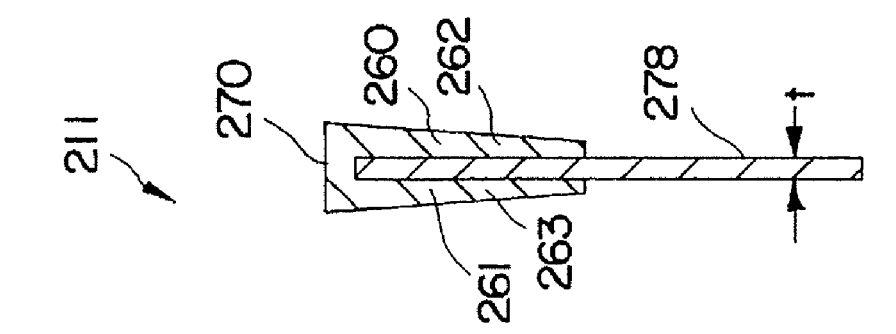
FIG. 7A is a cross-sectional of the pick holder view taken along line 7A-7A of FIG. 7, with a pick in the holder.
Figure 7:
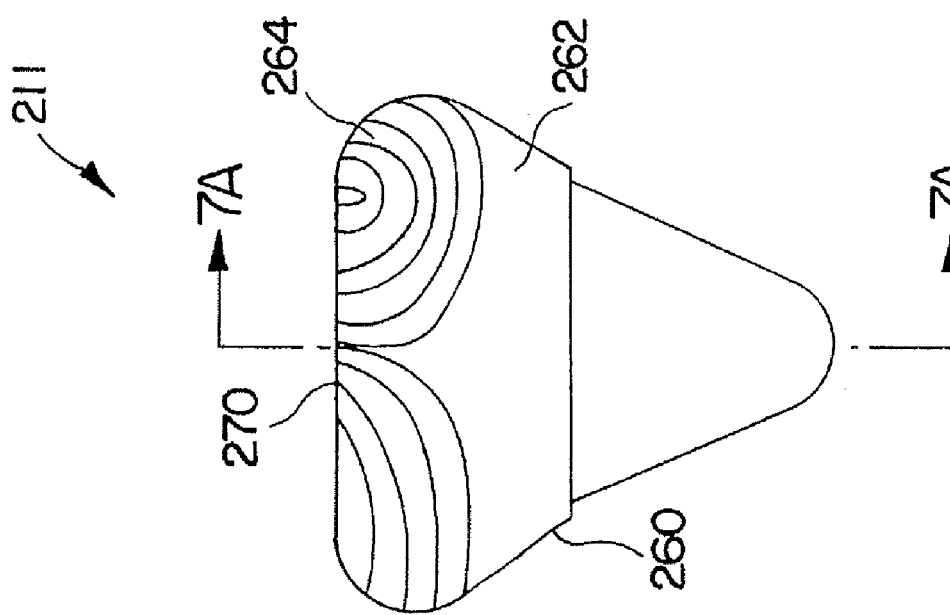
FIG. 7 is a plan view of another embodiment of the present invention in the form of a pick holder for holding a pick, wherein the pick holder includes original or simulated fingerprints.

Sides 260 and 261, as shown in FIG. 7A for side 260, preferably exhibit a shape very similar to that of a base portion of a standard pick, such as pick 278. However, the sides of holder 211 to not fully extend to a tip as with standard pick 278, preferably extending about one-half the length of a standard pick or at least the length for forming pocket 276, as shown in FIG. 7B, of a size sufficient for allowing a stable hold on standard pick 278 while also providing sufficient space for the formation thereon of the fingertip impressions.

As indicated above, surfaces 262 and 263 of holder 211 have the securitized fingerprint impressions as described in detail above with respect to pick 10. Accordingly, the various arrangements of the original or simulated fingerprint impressions in pick 10 are hereby incorporated for holder 211, and are not further described. Also, the various materials and methods for forming pick 10 and its fingerprint impressions, based on these various materials used, are also hereby incorporated for holder 211 for forming it with the various fingerprint impression arrangements.

In using holder 211, a pick 278 is simply inserted into pocket 276 and held in place by at least one of adhesive on inner surfaces 272 and 274 and the tapered pocket having an interference fit with the pick, as described above. In each case the standard pick is firmly held in the holder and increased grippability thereof is provided by the fingerprint impressions formed therein.

As shown in FIGS. 8 and 9, the invention further includes jewelry items including a collectable pick 10 or other small collectable item of the present invention. In the example of FIG. 8, the pick holder jewelry 500 is a necklace that includes an adjustable neck strand 502, as well as a holding portion 504 for removably yet securely retaining a guitar pick 520. Preferably, the holding portion 504 includes opposed forked portions 506 joined by a closed-end portion 508. An opening 509 is provided opposite the closed-end portion for receiving the pick 10. In the example of FIG. 9, the pick holder jewelry 500 is a pendant that includes a holding portion 504 that resembles a skeletal hand, with at least two fingers configured for removably yet securely retaining a guitar pick 520. The holding portion may further include a protruding pedestal 522 for engaging the pick 520, which pedestal may incorporate any known holding means such as, but not limited to, friction fittings, tabs, slots, hook and loop fasteners, magnets, glue, tack, tapes, and other known apparatus for permanently and/or removably engaging the pick 520.

Thus, an advantage of the present invention is that a collectable item, such as a stringed musical instrument pick, is provided having formed therein an original or simulated fingerprint, such as a securitized replica of a celebrity's fingerprint impression. Another advantage of this invention is that an original or simulated fingerprint impression can be embodied in an item such as a musical instrument pick formed from a material which is conformable at room temperature or at an elevated temperature, so that fingerprint impressions can be formed thereon via methods involving the application of fingertip pressure to form an original impression, optionally followed by the making of a simulated fingerprint impression incorporating into a collectable item.

Still another advantage of this invention is that, in the case of a collectable a guitar pick, an item is provided having two sides with surfaces having at least one securitized replica of a musician's fingerprint impression therein for personalizing the grip of the guitar pick and enhancing the grippability thereof. The impression may appear on either side, or on both sides.

Still another advantage of this invention is that a stringed musical instrument pick is provided having a original or simulated fingerprint impression of a thumbprint of a musician on one side and an original impression or simulated impression of the forefinger and middle-finger fingerprint impression of the same musician on the other side, improving the collectable value of the pick while also enhancing the grippability of the pick.

Yet another advantage of this invention is that a pick holder is provided which is formed from a flexible and highly grippable material, which includes a pocket for engaging a pick, thereby substantially increasing the grippability of the pick. Still another advantage of this invention is that a pick holder is provided for holding a pick therein, wherein the pick holder includes at least one original or simulated fingerprint impression for enhancing collectability and grippability thereof. And still another advantage of this invention is that a pick holder having fingerprint impressions formed therein is provided for use in holding either impressed or non impressed pick and increasing grippability thereof.

The present invention thus provides fingerprinted collectable items made by any of several methods. It is contemplated herein that an original fingerprint impression is taken from a person of interest, and is utilized to create a simulated fingerprint fixed in a tangible medium, the medium including but not limited to electronic, paper, plastic, and other known medium. The simulated fingerprint may optionally be altered, whether electronically or manually, such as by altering at least one identifying characteristic of the original fingerprint as embodied in the simulated fingerprint, so as to prevent the simulated fingerprint from being identical to the original fingerprint. An original fingerprint and/or a simulated fingerprint may be embodied in or applied to an item by any known means, including but not limited to pressure impressing, molding, injection molding, laser etching, laser engraving, surface imprinting, stamping, hot stamping, casting, laminating, adhering, and combinations thereof.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A collectable item comprising at least one surface, wherein the at least one surface has an impressed area that includes a first simulated fingerprint impression derived from a first original fingerprint impression, wherein at least one identifying characteristic of the first original fingerprint impression is altered to create the first simulated impression, and wherein the first simulated fingerprint impression is not identical to the first original fingerprint impression, to prevent the use of the first simulated fingerprint for identity theft.

2. The collectable item according to claim 1, wherein the item further includes at least one surface having a second simulated fingerprint impression derived from a second original fingerprint impression, wherein at least one identifying characteristic of the second original fingerprint impression is altered to create the second simulated impression, and wherein said first and second simulated fingerprint impressions are not identical.

3. The collectable item according to claim 2, wherein the first simulated fingerprint impression is an index fingertip impression and the second simulated fingerprint impression is a middle-finger fingerprint impression.

4. The collectable item according to claim 1, wherein the impressed area is formed from a material that is malleable when heated.

5. The collectable item according to claim 1, wherein the impressed area is formed from a material selected from the group consisting of a thermal hardening material, a thermal softening material, and a moisture hardening material.

6. The collectable item according to claim 1, wherein the impressed area is formed from a material which is malleable at substantially room temperature and which sets through heating.

7. The collectable item according to claim 2, wherein the item comprises a laminate including a first layer, and wherein at least one of the first simulated fingerprint impression and second simulated fingerprint impression is formed in the first layer.

8. The collectable item according to claim 7, wherein the first layer is formed from a material that is malleable when heated.

9. The collectable item according to claim 8, wherein said first layer is formed from a material selected from the group consisting of a thermal hardening material, a thermal softening material, and a moisture hardening material.

10. The collectable item according to claim 8, wherein said first and second layers are formed from a material which is malleable at substantially room temperature and which sets through heating.

11. The collectable item according to claim 8, further including a second layer opposite the first layer and a central layer therebetween, the first and second layers being attached to opposite sides of the central layer.

12. The collectable item of claim 1, wherein the collectable item is selected from the group consisting of golf club grips, tennis racquet grips, baseball bats, bowling balls, surfboard and skateboard surfaces, steering wheels, guitar necks, guitar picks, drum sticks, keyboards, car key holders and grips, necklaces and charm bracelets and charms, pendants, key chain fobs, and zipper pulls.

13. A process for producing a collectable item, comprising the steps of:
- providing an original fingerprint impression based on an original fingerprint in a first medium;
- altering the original fingerprint impression to create at least one simulated fingerprint impression in a second medium so that the simulated fingerprint impression is not identical to the original fingerprint impression, to prevent the use of the first simulated fingerprint for identity theft; and
- applying the simulated fingerprint impression to an item to create a collectable item.

14. The process of claim 13, wherein the step of altering comprises of altering at least one identifying characteristic so that the simulated fingerprint impression can be distinguished from the original fingerprint impression.

15. The method of claim 13, wherein the step of applying the simulated impression to the item comprises applying by at least one of molding, hot stamping, surface ink imprinting, and laser engraving.

16. The method of claim 13, wherein the item is selected from the group consisting of is selected from the group consisting of golf club grips, tennis racquet grips, baseball bats, bowling balls, surfboard and skateboard surfaces, steering wheels, guitar necks, guitar picks, drum sticks, keyboards, car key holders and grips, necklaces and charm bracelets and charms, pendants, key chain fobs, and zipper pulls.

17. The method of claim 13, wherein the collectable item is a training aid for emulating a celebrity, the training aid comprising an item having a simulated fingerprint impression, the simulated impression corresponding to an original fingerprint of the celebrity made while using a similar item.

* * * * *